United States Patent [19]

Brun et al.

[11] Patent Number: 4,689,189

[45] Date of Patent: Aug. 25, 1987

[54] COMPOSITE OF $Si_3N_4$ BY INFILTRATION

[75] Inventors: Milivoj K. Brun; William B. Hillig, both of Ballston Lake, N.Y.

[73] Assignee: General Electric Company, Schenectady, N.Y.

[21] Appl. No.: 907,440

[22] Filed: Sep. 15, 1986

Related U.S. Application Data

[62] Division of Ser. No. 740,444, Jun. 3, 1985.

[51] Int. Cl.$^4$ ............................................. C04B 35/58
[52] U.S. Cl. ...................................... 264/62; 501/97; 501/151
[58] Field of Search ...................... 264/101, 65, 66, 62; 501/97, 151

[56] References Cited

U.S. PATENT DOCUMENTS

| | | | |
|---|---|---|---|
| 2,618,565 | 11/1952 | Nicholson | 501/97 |
| 3,031,342 | 11/1962 | Kertesz | 417/372.2 |
| 4,119,475 | 11/1978 | Prochezka | 501/97 |
| 4,146,379 | 3/1979 | Copley et al. | 501/96 |
| 4,240,835 | 12/1980 | Laskow et al. | 501/88 |
| 4,457,496 | 7/1984 | de Jurye et al. | 501/151 |
| 4,484,972 | 11/1984 | Ebata et al. | 501/151 |

FOREIGN PATENT DOCUMENTS 571497 10/1977 U.S.S.R. ............................. 501/97

OTHER PUBLICATIONS

Ceramics Bulletin, vol. 63, Dec. 1984, p. 1476.

*Primary Examiner*—Mark L. Bell
*Attorney, Agent, or Firm*—Jane M. Binkowski; James C. Davis, Jr.; Paul R. Webb, II

[57] ABSTRACT

A composite is produced by infiltrating the open pores of a polycrystalline silicon nitride body with a member selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride, and a mixture of said fluoride with a metal oxide.

9 Claims, 4 Drawing Figures

COMPOSITE OF SI$_3$N$_4$ BY INFILTRATION

This application is a division of application Ser. No. 740,444, filed June 3, 1985, now U.S. Pat. No. 4,661,461.

This invention relates to the production of a ceramic composite of predetermined shape and size comprised of a polycrystalline silicon nitride body containing an infiltrant member.

Reaction bonded silicon nitride is an outstanding high temperature structural material because of its creep resistance and its convenient fabrication into complex shapes with near net shape capabilities. Its use, however, is limited by its low fracture toughness and inadequate oxidation resistance. By nature of its production—by nitridation of silicon compacts—it is generally limited to about 90% of theoretical density before it becomes impossible to introduce further nitrogen for the reaction. The resultant network of open pores provides easy access of air into the interior, thus increasing its oxidation susceptibility. This oxidation results in the formation of silica, which upon crystallizing forms cristobalite. The cristobalite undergoes a strength degradation phase change at about 175°–275° C. and leads to the degradation of the silicon nitride article.

In accordance with the present invention, the open porosity of a polycrystalline silicon nitride body is substantially decreased or eliminated by the introduction of a second phase into its open pore structure by a liquid infiltration method. Specifically, this second phase is a relatively inert material such as, for example, calcium fluoride (CaF$_2$) or magnesium fluoride (MgF$_2$). Magnesium fluoride and calcium floride melt at 1248° C. and 1417° C., respectively, to form quite fluid melts which can then be conveniently used to perform infiltrations.

Briefly stated, the present process for producing a composite comprised of from about 60% by volume to about 98% by volume silicon nitride and an infiltrant member comprises providing a polycrystalline silicon nitride body of predetermined shape and size having a closed porosity of less than about 10% by volume and an open porosity ranging from about 2% by volume to about 40% by volume of the body, contacting said silicon nitride body with a member selected from the group consisting of barium fluoride, calcium fluoride, magnesium fluoride, strontium fluoride, cerium fluoride, dysprosium fluoride, gadolinium fluoride, lanthanum fluoride, samarium floride, yttrium fluoride and a mixture of said fluoride and a metal oxide, heating the resulting structure to an infiltration temperature ranging from the liquidus temperature of said member to below the temperature at which there is significant vaporization of said member, infiltrating the resulting liquid member into the open porosity of said silicon nitride body, said infiltration temperature having no significant deleterious effect on said silicon nitride body, and cooling the resulting infiltrated body to produce said composite, said cooling having no significant deleterious effect on said composite.

The present polycrystalline composite is comprised of polycrystalline silicon nitride and a member selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride and a mixture of said fluoride and a metal oxide, said silicon nitride ranging in amount from about 60% by volume to about 98% by volume of said composite, said member ranging in amount from about 2% by volume to about 40% by volume of said composite, said composite having a total porosity of less than about 10% by volume and an open porosity of less than about 5% by volume of the composite.

Those skilled in the art will gain a further and better understanding of the present invention from the detailed description set forth below, considered in conjunction with the figures accompanying and forming a part of the specification, in which.

Figure 4:
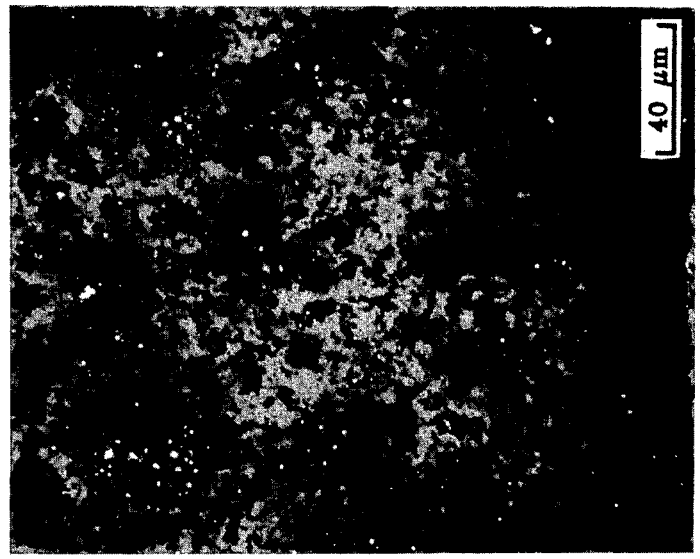
Figure 3:
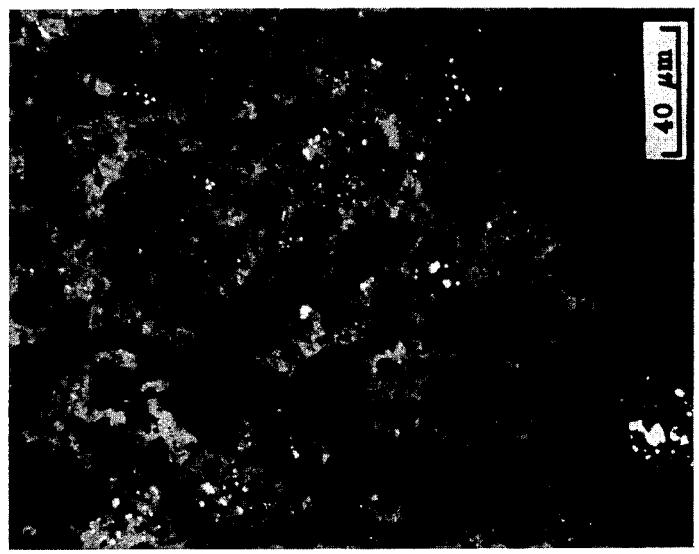

FIG. 3 is a photomicrograph (magnified 100X) of a polished surface of a polycrystalline body of silicon nitride (light colored phase) having an open porosity (dark color) of about 20% by volume, i.e. it is commercially available reaction bonded silicon nitride body produced by the nitridation of a silicon compact; and FIG. 4 is a photomicrograph (magnified 100X) of a polished surface of a composite comprised of silicon nitride (light colored phase) and magnesium fluoride (darker colored phase) prepared by the present process, i.e. it is the silicon nitride body of FIG. 3 which has been infiltrated with magnesium fluoride.

Figure 1:
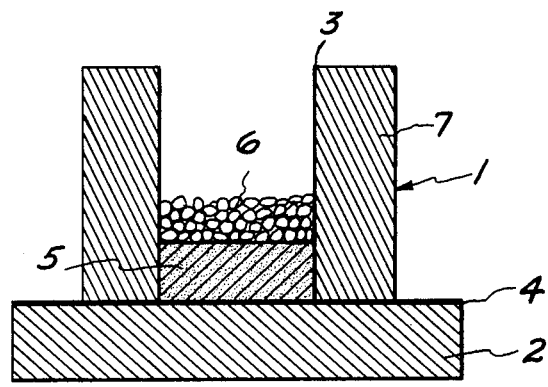
FIG. 1 is a sectional view through a structure showing an embodiment for carrying out the present process.

FIG. 1 is a cross section of a structure 1 which illustrates one embodiment of the present process prior to infiltration. Graphite cylinder 7 and graphite base 2 have a coating of boron nitride 4 and 3 to prevent any sticking and facilitate removal of the resulting composite. Porous body 5 is comprised of the present polycrystalline silicon nitride with open porosity and a layer of granules of the present infiltrant 6 is shown in contact with the silicon nitride body 5 and covers its entire top surface.

Figure 2:
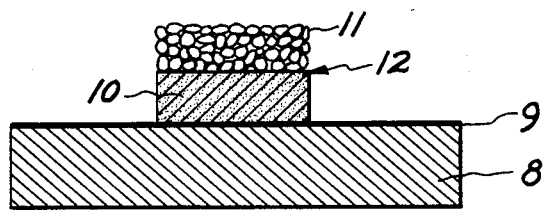
FIG. 2 is a sectional view through another structure showing another embodiment for carrying out the present process.

FIG. 2 shows a cross section of a free standing assembly 12 of a layer of granules of the present infiltrant 11 in contact with the upper surface of the present porous silicon nitride body 10. Assembly 12 is set on graphite base 8 having a boron nitride coating 9 to prevent sticking.

Graphite cylinder 7 and bases 2 and 8 are a convenience and are not required for carrying out the present process. However, structures chemically inert to silicon nitride and the present infiltrant, such as graphite cylinder 7 and base 2, provide greater precision in the making of a finished product and also provide better control of the amount of infiltrant which is needed to penetrate the body.

In carrying out the present process, a silicon nitride body is provided which has a closed porosity of less than about 10% by volume of the body and an open porosity ranging from about 2% by volume to about 40% by volume of the body.

Since the present process has no effect on the closed pores of the body, the present composite will have a closed porosity which is the same as that of the starting silicon nitride body. By closed porosity it is meant herein closed pores or voids in the silicon nitride body and composite, i.e. pores not open to the surface of the body or the composite and therefore not in contact with the ambient atmosphere. Preferably, the closed porosity is less than about 5% by volume of the body or composite, and most preferably, less than about 1% by volume of the body or composite. Also, preferably, the closed pores are small, preferably less than one micron, and sufficiently or significantly uniformly distributed through the body and composite so that they have no significantly deletrious or deteriorating effect on their mechanical properties.

By open porosity of the silicon nitride body, it is meant herein pores or voids which are open to the surface of the body and thereby making the interior surfaces accessible to the ambient atmosphere.

The void or pore content, i.e. both open and closed porosity, of the silicon nitride body and present composite can be determined by standard metallographic techniques, such as, for example, optically examining a polished cross section of the body.

In another technique, the open porosity of the silicon nitride body and composite can be determined by suspending the body and immersing it in water or other liquid and determining the observable weight gain shown by the suspended-immersed body. The weight gain observed is used to calculate the open porosity of the body.

The present polycrystalline silicon nitride body has a high degree of direct $Si_3N_4$-to-$Si_3N_4$ bonding. This type of bonding is produced by the reaction bonding of silicon and nitrogen, or by sintering a compact of silicon nitride powder, or by hot pressing silicon nitride powder.

The present polycrystalline silicon nitride body can be produced by a number of known or conventional techniques.

More specifically, the present silicon nitride body can be produced by conventional hot pressing of silicon nitride powder, generally having an average particle size which is submicron, with or without densification additive, in a nonoxidizing atmosphere, preferably nitrogen, at a temperature generally ranging from about 1600° C. to about 1850° C. under a pressure which produces the present silicon nitride body. Representative of densification additives which can be used with silicon nitride are magnesium oxide, yttrium oxide, strontium oxide, cerium oxide, and magnesium silicide. Generally, densification additives are used in an amount ranging from about 0.5% by weight to about 3% by weight of the silicon nitride. U.S. Pat. No. 4,093,687, incorporated herein by reference, discloses hot pressing of silicon nitride.

Another technique for producing the present silicon nitride body comprises sintering a compact of silicon nitride powder and about 5% magnesium oxide at from about 1500° C. to 1900° C. under superatmospheric pressure of nitrogen, generally ranging up to about 10 atmospheres.

Yet another technique for producing the present polycrystalline silicon nitride body is disclosed in U.S. Pat. No. 4,119,689 to Prochazka et al, incorporated herein by reference, which discloses sintering a green body of silicon nitride and beryllium additive at superatmospheric pressure at a temperature ranging from about 1900° C. to about 2200° C.

The present reaction bonded polycrystalline silicon nitride bodies are commercially available. One technique for producing the present silicon nitride body by reaction bonding is disclosed in U.S. Pat. No. 4,017,319 to Greskovich et al, incorporated herein by reference, which discloses sintering a green body of silicon powder containing boron additive at a temperature ranging from 1250° C. to below the melting point of silicon producing a sintered silicon body having a density ranging from 60% to 75% and having pores which are interconnecting and open to the surface of the body and reacting the sintered silicon body with gaseous nitrogen at a temperature ranging from 1100° C. to below the melting point of silicon to form a polycrystalline silicon nitride body.

The present silicon nitride body should contain no significant amount of silica which would have a significantly deleterious effect, i.e. an amount of silica which would react with the present infiltrant to produce a gas during infiltration, which would impede infiltration. Preferably, the present silicon nitride body contains silica in an amount of less than 4% by volume more preferably less than about 1% by volume of the total volume of silicon nitride. Most preferably, the silicon nitride body is free of silica.

In the present invention, the silicon nitride body has the shape and dimensions required of the composite, or does not differ significantly from the shape and dimensions of the resulting composite. The silicon nitride body can be in any form desired, such as, for example, it can be hollow and/or of simple shape and/or of complex shape.

The open porosity of the present silicon nitride body depends mostly on the composition desired in the resulting composite. Specifically, to produce the present composite containing the infiltrant in an amount ranging from about 2% by volume to about 40% by volume of the composite, the present silicon nitride body has an open porosity ranging from about 2% by volume to about 40% by volume of the body.

In the present process, the infiltrant is a non-water soluble material which melts above 1000° C. More specifically, the infiltrant is selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride and a mixture of said fluoride and a metal oxide. The present infiltrant includes a mixture of these fluorides as well as a mixture of metal oxides desired to combine with the fluoride or fluorides.

In forming the mixture with metal oxide, the present fluoride is used to lower the melting point of the oxide. More specifically, the present fluoride is admixed with the metal oxide in at least an amount which produces a mixture which at infiltration temperature is liquid and has a reasonable viscosity so it can be infiltrated into the open porosity of the silicon nitride body in a reasonable period of time. The present fluoride-metal oxide mixture has a liquidus temperature or is liquid at temperatures which have no significant deleterious effect on the silicon nitride body, and generally, it has a liquidus temperature above 1000° C. but below about 1500° C. Generally, at infiltration temperatures, the fluoride-metal oxide mixture has a viscosity of less than 10 poises, preferably less than 5 poises and more preferably less than 1 poise. Generally, the fluoride is present in the fluoride-metal oxide mixture in an amount of at least about 10% by volume of the mixture. The present fluoride-metal oxide mixture can be formed in a conventional manner.

The metal oxide is one which does not significantly react with silicon nitride or the present fluoride. Also, in liquid form, the metal oxide is soluble in the liquid fluoride. Representative of the metal oxides useful in the present invention are magnesium oxide, calcium oxide, alumina and mixtures thereof.

In carrying out the present process, the infiltrant is placed in contact with the silicon nitride body. Preferably, to inhibit its vaporization during infiltration, the infiltrant powder is compacted into a pressed powder form or it is used in the form of large granules. Preferably, a layer of the infiltrant is deposited on as large as possible a surface area of the silicon nitride body to promote infiltration. In one embodiment of the present invention, an aqueous slurry of infiltrant powder is used, and the slurry is coated on all of the surface portion of the silicon nitride body which is to be exposed during infiltration, and the body is dried leaving a coating or residue of infiltrant thereon. Preferably, a continuous coating of infiltrant is formed in this manner on the body. Preferably, the amount of infiltrant deposited on the silicon nitride body is sufficient to infiltrate the body to produce the present composite so that the infiltration can be completed in a single step. However, if desired, the silicon nitride body can be partially infiltrated and the infiltration repeated until the present composite is produced.

Preferably, in an embodiment of the present process where the silicon nitride body may contain desorbable material on its surface, the structure comprised of infiltrant deposited on the silicon nitride body is initially heated to a temperature below the melting point of the infiltrant, typically from about 800° C. to below the melting point of the infiltrant, for a period of time sufficient to degas the silicon nitride body, typically for about 10 minutes. Such degassing is only necessary when the silicon nitride body has desorbable material on its surface, such as hydrogen chloride, which would lead to gas evolution during the infiltration causing gas pockets or gross porosity. The extent of such degassing of the silicon nitride body is determinable empirically and depends on the particular silicon nitride body used. The completion of degassing is indicated by the stabilization of the pressure in the furnace.

After degassing, if any, the temperature is increased to the infiltration temperature which ranges from the liquidus temperature of the infiltrant to a temperature at which no significant vaporization of the infiltrant occurs. The infiltration temperature should have no significant deleterious effect on the silicon nitride body, and generally, it is below about 1500° C. Preferably, to prevent significant vaporization of the infiltrant, infiltration is carried out at as low a temperature as possible, and preferably no higher than about 50° C. above the liquidus temperature of the infiltrant. To ensure infiltration of the silicon nitride body, the entire body should be above the liquidus temperature of the infiltrant during infiltration. During infiltration of the silicon nitride body, the infiltrant does not lead to any reaction product in the present composite. Generally, total infiltration time is less than 30 minutes.

Generally, the heating rate to below or just below the melting point of the infiltrant ranges up to about 100° C. per minute. Commencing just below the melting point of the infiltrant, i.e. preferably within about 15 degrees of the onset of the melting, and continuing to the maximum infiltration temperature, the heating rate preferably ranges from about 1° C. per minute to about 10° C. per minute, more preferably from about 1° C. per minute to about 5° C. per minute, to facilitate controlled infiltration of the liquid infiltrant into the open pores of the body. Overheating may cause significant vaporization of the infiltrant and may interfere with the present infiltration and also may cause undesirable deposition in the heating apparatus.

The present process comprises a pressureless infiltration of the silicon nitride body, i.e. it is carried out under a vacuum or at ambient pressure and no mechanical pressure or superatmospheric pressure is applied during infiltration. More specifically, the present degassing and infiltration is carried out in a non-oxidizing partial vacuum or a non-oxidizing atmosphere which has no significant deleterious effect in the present process or composite, and preferably, such an atmosphere is nitrogen, argon, helium or mixtures thereof. Generally, the present partial vacuum ranges from about 0.1 Torr to about 400 Torr, and preferably, from about 100 Torr to about 400 Torr. During infiltration, higher partial pressures are preferred to impede vaporization of the infiltrant.

When the present infiltration is completed, the infiltrated body is allowed to solidify producing the present composite. Specifically, the infiltrated body is cooled at a rate which has no significant deleterious effect thereon, i.e. it should be cooled at a rate which avoids any cracking of the resulting composite. The cooling rate, therefore, is determinable empirically and depends largely on the geometry and size of the infiltrated body. Generally, a cooling rate of less than about 50° C. per minute is usually useful for small bodies of simple shape and a cooling rate of about 20° C. per minute or lower is useful for large bodies of complex shape. Preferably, the infiltrated body is cooled to ambient temperature prior to removal from the heating apparatus.

Any excess infiltrant which may be present on the surface of the resulting composite can be readily removed by a number of techniques, such as, for example, simply by gentle scraping or abrading.

The present composite does not contain any reaction product of silicon nitride and infiltrant which is detectable by scanning electron microscopy.

For most applications, the present composite has a silicon nitride content ranging from about 80% by volume to about 90% by volume of the composite.

The present composite has a total porosity, i.e. the total amount of closed and open pores, of less than about 10% by volume of the composite and an open porosity of less than about 5% by volume of the composite. Preferably, the present composite has an open porosity of less than about 2% by volume and more preferably less than about 1% by volume of the composite. Most preferably, the present composite has no detectable or no significant open porosity, and still more preferably it is a fully dense material, i.e. it is of theoretical density ±0.01%.

The present invention makes it possible to fabricate a composite of desired shape and size directly. For example, the present composite can be in the form of a flat body, a crucible, a hollow shaped article, a long rod, a gasket, or a wear resistant part such as a bushing. Since the present composite is produced in a predetermined configuration of predetermined dimensions, it required little or no machining. A particular advantage of the present invention is that the present composite can be produced directly in a wide range of sizes and shapes thereby eliminating expensive and tedious machining.

The present composite has a number of uses. For example, it is useful as a high temperature structural material, as a gasket, and as a wear resistant part such as a bushing.

Ser. No. 692,468, now abandoned, filed Jan. 18, 1985, for "COMPOSITE OF SIC and CaF$_2$ OR MgF$_2$ BY INFILTRATION" by W. B. Hillig and assigned to the assignee hereof and incorporated herein by reference discloses a composite of silicon carbide and calcium fluoride or magnesium fluoride produced by forming a porous compact of silicon carbide and infiltrating the pores of the compact with molten calcium fluoride or magnesium fluoride.

The invention is further illustrated by the following examples where the procedure was as follows unless otherwise noted:

Calcium fluoride and magnesium fluoride were of Reagent Grade.

A commercially available polycrystalline silicon nitride body produced by reaction bonding was used. Each silicon nitride body had an open porosity of about 20% by volume and a closed porosity of less than about 5% by volume of the body and contained some residual silicon in an amount of less than about 4% by volume of the body. Each body was in the form of a disk about 0.375" in diameter and about 0.5" in thickness.

Oxidation resistance of the silicon nitride body or the present composite was measured by exposing it to air at 1000° C. for a sufficiently long time to establish steady state weight gain which was several hours.

EXAMPLE 1

The polycrystalline silicon nitride body, i.e. disk, weighed 1.76 grams and had a polished surface which is shown in FIG. 3. It was placed in an open molybdenum crucible and covered with 4.58 grams of magnesium fluoride powder. The molybdenum crucible was placed in a closed graphite crucible and inserted in a graphite furnace housed in a bell jar.

The furnace was heated in a vacuum at 100° C. per minute to 1200° C. where it was held for about 10 minutes to degas any desorbable material from the silicon nitride body. The temperature was then increased at a rate of about 100° C. per minute to 1300° C. where it was held for 15 minutes to infiltrate the liquid magnesium fluoride into the silicon nitride body and then it was furnace cooled to ambient temperature. Excess fluoride was easily removed from the infiltrated disc by scraping.

The resulting infiltrated disc, i.e. the present composite weighed 2.20 grams, so the amount of magnesium fluoride infiltrated was 0.44 grams. There was no dimensional change between the starting silicon nitride disc and the resulting composite.

When the composite was cut in half and polished, microscopic examination showed that essentially all open porosity was eliminated, i.e. it had an open porosity of less than 0.5% by volume of the composite, and that it was comprised of silicon nitride and magnesium fluoride. A polished section of the composite is shown in FIG. 4.

Oxidation resistance of the composite was measured and it was found that it gained weight at the rate of 0.00048% per hour. In contrast, the uninfiltrated silicon nitride disc gained weight at a rate of 0.023% per hour. The present process, therefore, resulted in a decrease of oxidation rate by a factor of 48.

This composite would be useful as a high temperature oxidation resistant structural material.

EXAMPLE 2

A silicon nitride disk was placed in a graphite crucible and covered with calcium fluoride powder in excess of the amount needed to fill the open pores of the disk. All carbon surfaces making contact with the silicon nitride disk or fluoride powder were previously coated with a slurry of boron nitride. The crucible was covered and placed in a resistance furnace made from Grafoil and heated in a nonoxidizing atmosphere of 200 Torr of nitrogen to 1500° C. where it was held for 30 minutes, during which time the liquid calcium fluoride infiltrated the open pores of the disk, then furnace cooled to ambient temperature.

Excess fluoride was easily removed from the infiltrated disk, by scraping. There was no dimensional change between the silicon nitride disk and the resulting composite.

The density of the composite was measured, and it was determined that it had an open porosity of less than about 1% by volume of the composite.

What is claimed is:

1. A process for producing a polycrystalline composite consisting essentially of from about 60% by volume to about 98% by volume of a continuous silicon nitride body and an infiltrant member which consists essentially of providing a continuous polycrystalline body of silicon nitride having a closed porosity of less than about 10% by volume and an open porosity ranging from about 2% by volume to about 40% by volume of said body, contacting said silicon nitride body with a member selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride, a mixture thereof and a mixture of at least about 10% by volume of said fluoride and a metal oxide, wherein said mixture of said fluoride and metal oxide has a liquidus temperature ranging from above 1000° C. to below about 1500° C., heating the resulting structure to an infiltration temperature ranging from the liquidus temperature of said member to below the temperature at which there is significant vaporization of said member, infiltrating the resulting liquid member into the open porosity of said silicon nitride body, said infiltration temperature having no significant deleterious effect on said silicon nitride body, and allowing the resulting infiltrated body to solidify producing said composite, said member in said composite being in the form of a network open to the surface of said composite and none of said member being completely enveloped by said silicon nitride, said composite having a total porosity of less than about 10% by volume and an open porosity of less than about 5% by volume of said composite.

2. The process according to claim 1 wherein said member is calcium fluoride.

3. The process according to claim 1 wherein said member is magnesium fluoride.

4. The process according to claim 1 wherein said metal oxide is selected from the group consisting of magnesium oxide, calcium oxide and alumina.

5. The process according to claim 1 wherein the resulting structure is heated to a temperature ranging from about 800° C. to below the melting point of said member for a time sufficient to degas any desorbable material from said silicon nitride body before being heated to said infiltration temperature.

6. A process for producing a polycrystalline composite consisting essentially of from about 60% by volume to about 98% by volume of a continuous silicon nitride body and an infiltrant member which consists essentially of providing a continuous polycrystalline body of silicon nitride having a closed porosity of less than about 10% by volume and an open porosity ranging from about 2% by volume to about 40% by volume of said body, contacting said silicon nitride body with a member selected from the group consisting of calcium fluoride, magnesium fluoride and a mixture thereof, heating the resulting structure to an infiltration temperature ranging from the liquidus temperature of said member to below the temperature at which there is significant vaporization of said member, infiltrating the resulting liquid member into the open porosity of said silicon nitride body, said infiltration temperature having no significant deleterious effect on said silicon nitride body, and allowing the resulting infiltrated body to solidify producing said composite, said member in said composite being in the form of a network open to the surface of said composite and none of said member being completely enveloped by said silicon nitride, said composite having a total porosity of less than about 10% by volume and an open porosity of less than about 5% by volume of said composite.

7. The process according to claim 6 wherein the resulting structure is heated to a temperature ranging from about 800° C. to below the melting point of said member for a time sufficient to degas any desorbable material from said silicon nitride body before being heated to said infiltration temperature.

8. A process for producing a polycrystalline composite consisting essentially of from about 60% by volume to about 98% by volume of a continuous silicon nitride body and an infiltrant member which consists essentially of providing a continuous polycrystalline body of silicon nitride having a closed porosity of less than about 10% by volume and an open porosity ranging from about 2% by volume to about 40% by volume of said body, contacting said silicon nitride body with a member selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride, and a mixture thereof, heating the resulting structure to an infiltration temperature ranging from the liquidus temperature of said member to below the temperature at which there is significant vaporization of said member, infiltrating the resulting liquid member into the open porosity of said silicon nitride body, said infiltration temperature having no significant deleterious effect on said silicon nitride body, and allowing the resulting infiltrated body to solidify producing said composite, said member in said composite being in the form of a network open to the surface of said composite and none of said member being completely enveloped by said silicon nitride, said composite having a total porosity of less than about 10% by volume and an open porosity of less than about 5% by volume of said composite.

9. The process according to claim 8 wherein the resulting structure is heated to a temperature ranging from about 800° C. to below the melting point of said member for a time sufficient to degas any desorbable material from said silicon nitride body before being heated to said infiltration temperature.

* * * * *